United States Patent
Yamashita et al.

(10) Patent No.: US 7,051,353 B2
(45) Date of Patent: May 23, 2006

(54) PROGRAM GUIDE DISPLAY CONTROLLER AND TELEVISION RECEIVER

(75) Inventors: Akihiko Yamashita, Hyogo (JP); Masako Wakisaka, Osaka (JP); Hiroshi Tsunoda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/147,094

(22) PCT Filed: Apr. 25, 1997

(86) PCT No.: PCT/JP97/01483

§ 371 (c)(1),
(2), (4) Date: Oct. 27, 1998

(87) PCT Pub. No.: WO97/41689

PCT Pub. Date: Nov. 6, 1997

(65) Prior Publication Data

US 2001/0035915 A1 Nov. 1, 2001

(30) Foreign Application Priority Data

Apr. 30, 1996 (JP) ................................. 8-109017
Jun. 10, 1996 (JP) ................................. 8-147034
Jun. 13, 1996 (JP) ................................. 8-152228

(51) Int. Cl.
*H04N 5/445* (2006.01)
*H04N 7/16* (2006.01)

(52) U.S. Cl. ........................ 725/40; 725/29; 725/47; 725/86; 725/104; 348/563; 348/569; 348/906

(58) Field of Classification Search ............ 348/1, 348/3, 10, 563, 564, 906, 565, 569, 6; 386/83, 386/10; 455/2, 6.2, 6.3; 345/327; 725/9–11, 725/13–14, 56, 29, 40, 44, 45, 47, 50, 61, 725/69, 86, 89, 90, 104; H04N 5/445, 5/50
See application file for complete search history.

(56) References Cited

U.S. PATENT DOCUMENTS

| 5,508,731 | A | * | 4/1996 | Kohorn ................. 348/12 |
| 5,543,933 | A | * | 8/1996 | Kang et al. ............ 348/906 |
| 5,576,755 | A | * | 11/1996 | Davis et al. .......... 348/13 |
| 5,585,838 | A | * | 12/1996 | Lawler et al. ........ 348/13 |
| 5,604,528 | A | * | 2/1997 | Edwards et al. ...... 348/5.5 |
| 5,677,895 | A | * | 10/1997 | Mankovitz ........... 348/563 |

(Continued)

FOREIGN PATENT DOCUMENTS

EP  0 721 253 A2  7/1996

*Primary Examiner*—Matthew C. Bella
*Assistant Examiner*—Wesner Sajous
(74) *Attorney, Agent, or Firm*—Arent Fox PLLC

(57) ABSTRACT

A program-guide-display controlling apparatus for displaying a plurality of program guides on a display unit in a matrix form by using one of the ordinate and the abscissa as a channel number axis and another one as a time axis comprises means for displaying to discriminate a time period in which a purchased program is present and a time period in which the purchased program is not present, so as to ensure that a situation in which two or more PPV programs which are broadcast during the same time period happen to be purchased is made difficult to occur.

8 Claims, 13 Drawing Sheets

U.S. PATENT DOCUMENTS

| | | | |
|---|---|---|---|
| 5,790,198 A * | 8/1998 | Roop | 348/6 |
| 5,850,218 A * | 12/1998 | LaJoie et al. | 725/45 |
| 5,889,506 A * | 3/1999 | Lopresti et al. | 345/158 |
| 5,893,073 A * | 4/1999 | Kasso et al. | 705/8 |
| 5,929,932 A * | 7/1999 | Otsuki et al. | 348/569 |
| 5,940,073 A * | 8/1999 | Klosterman et al. | 348/10 |
| 5,986,650 A * | 11/1999 | Ellis et al. | 725/40 |
| 6,181,335 B1 * | 1/2001 | Hendricks | 345/328 |
| 6,230,323 B1 * | 5/2001 | Hamma et al. | 725/47 |
| 6,481,011 B1 * | 11/2002 | Lemmons | 725/47 |
| 6,493,876 B1 * | 12/2002 | Defreese et al. | 725/100 |
| 2003/0079227 A1 * | 4/2003 | Knowles et al. | 725/50 |

* cited by examiner

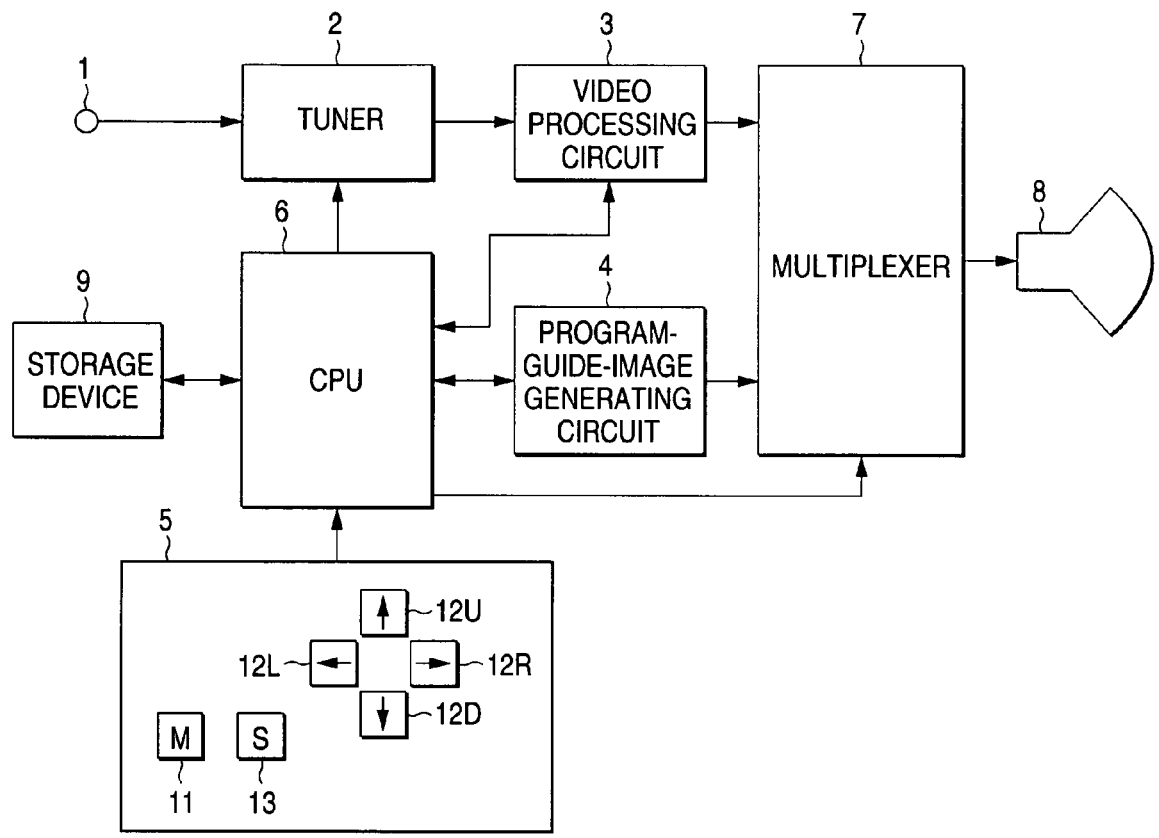

FIG. 11

DESIGNATED TIME RANGE SETTING

START TIME    18 : 00

ENDING TIME   23 : 00

OK    CANCEL

FIG. 12

|       | 11:00 | 11:30 | 12:00 | 12:30 | 13:00 |
|-------|-------|-------|-------|-------|-------|
| CH. 2 | A     |       | B     |       |       |
| CH. 4 | C     | D     | E     | F     | G     |
| CH. 6 | H     |       | I     |       | J     |
| CH. 8 | K     | L     |       | M     |       |
| CH. 10| N     |       | O     | P     |       |

FIG. 14

| | | | | | |
|---|---|---|---|---|---|
| DESIGNATED TIME RANGE SETTING | | | | | |
| MON | 18 | : 00 | 23 | : 00 | |
| TUE | 18 | : 00 | 23 | : 00 | |
| WED | 18 | : 00 | 23 | : 00 | |
| THU | 18 | : 00 | 23 | : 00 | |
| FRI | 18 | : 00 | 23 | : 00 | |
| SAT | 12 | : 00 | 24 | : 00 | OK |
| SUN | 10 | : 00 | 23 | : 00 | CANCEL |

PROGRAM GUIDE DISPLAY CONTROLLER AND TELEVISION RECEIVER

TECHNICAL FIELD

The present invention relates to a program-guide-display controlling apparatus for displaying a program guide necessary for selecting a program desired by a user from a plurality of channels.

BACKGROUND ART

In the digital satellite broadcasting system (DSS) which has been put to commercial use in the United States, a multiplicity of more than 150 channels are available, and very numerous programs are being provided. In this system, guide information on programs which are presently being broadcast and programs which will be broadcast in the future is transmitted at predetermined time intervals together with primary program data. A user-side terminal has a function of displaying a program guide screen (program guide table) on the basis of the program guide information. As shown in FIG. 10, a partial program guide table of an entire program guide table E corresponding to the entire program guide information received is displayed on the user-side terminal. A plurality of program guides are displayed on the program guide screen in a matrix form by using the ordinate as a channel number axis and the abscissa as a time axis. In this example, programs on five channels for a period of two hours and a half are displayed. At the left end, channel numbers are displayed in a vertical arrangement. Frames which indicate time periods of programs which are broadcast on the respective channels are displayed in rows corresponding to the respective channels, and titles (A to P) are displayed in the respective frames.

The display screen is scrolled vertically or horizontally as the user operates a cursor, thereby making it possible to display other portions of the program guide table within the entire program guide table E.

Programs which are provided in the DSS include no-charge programs which can be viewed free of charge if the user pays a system utilization fee, including a charge for subscribing to the DSS, a basic fee, and the like, as well as chargeable programs for which fees are charged separately from the system utilization fee. In addition, the chargeable programs include those which the user purchases in advance in units of channels, and those for which fees are charged only when the programs are viewed (PPV: pay per view). To view a PPV program, a procedure for purchase must be taken on the television screen before the program is started or when that program is being broadcast.

To purchase a PPV program, a PPV program to be purchased is selected from a program guide table displayed on the television screen shown in FIG. 10. Then, since a purchase procedure screen is displayed, a purchase procedure is taken in accordance with the instructions on the screen.

Since the user has not necessarily memorized accurately the purchased PPV program, there are cases where the user happens to purchase by subscription two or more PPV programs which are broadcast in the same time period. In addition, in a case where a plurality of users are present for one user-side terminal, there is a high possibility that the user happens to purchase by subscription two or more PPV programs which are broadcast in the same time period for one user-side terminal.

In addition, time periods during which users can view television programs and time periods during which users wish to view television programs are generally fixed for each user. For this reason, broadcast time periods of PPV programs which are purchased by subscription by users are also generally fixed for each user. Accordingly, it will be convenient if time periods during which users wish to view television programs can be set for each user, and as for a program guide on programs which are broadcast during the set time period, the user is able to recognize that the program guide is the program guide on programs which are broadcast during the time period set by the user.

An object of the present invention is to provide a program-guide-display controlling apparatus and a television receiver in which the situation is made unlikely to occur in which two or more PPV programs which are broadcast during the same time period happen to be purchased, or such a display can be used as a rough criterion as to whether or not a PPV program or the like is to be purchased, by providing display in the program guide display such that a time period for which the user made a purchase by subscription and a time period designated by the user can be discriminated.

DISCLOSURE OF THE INVENTION

In accordance with the present invention, there is provided a program-guide-display controlling apparatus for displaying a plurality of program guides on a display unit in a matrix form by using one of the ordinate and the abscissa as a channel number axis and another one as a time axis, comprising: means for displaying to discriminate a time period in which a purchased program is present and a time period in which the purchased program is not present.

In the program-guide-display controlling apparatus in accordance with a first aspect of the present invention, since display is provided to discriminate the time period in which a purchased program is present and the time period in which the purchased program is not present, the user is able to immediately know a time period in which a purchased program is present, through the program guide screen. For this reason, it is possible to prevent a situation in which two or more programs are purchased by mistake for the same time period.

In accordance with another aspect of the present invention, there is provided a program-guide-display controlling apparatus for displaying a plurality of program guides on a display unit in a matrix form by using one of the ordinate and the abscissa as a channel number axis and another one as a time axis, comprising: setting means for allowing an arbitrary time period to be set by a user; and discriminatingly displaying means for effecting display to discriminate the time period set by the user and other time periods. Accordingly, since display is provided to discriminate from the other time periods, it is possible to recognize at a glance the program guide on programs which are broadcast during the time period set by the user. Accordingly, the purchase and the like by subscription of PPV programs which are broadcast during the time period set by the user can be facilitated.

BRIEF DESCRIPTION OF THE DRAWINGS

FIG. 1 is a block diagram illustrating a configuration of a user-side terminal;

FIG. 2 is a diagram illustrating a display table;

FIG. 11 is a diagram illustrating an example of a time-zone setting screen;

FIG. 12 is a diagram illustrating a example of the program guide screen displayed in a case where a time period has been set by the user;

FIG. 14 is a diagram illustrating another example of the time-zone setting screen;

BEST MODE FOR CARRYING OUT THE INVENTION

Figure 3:
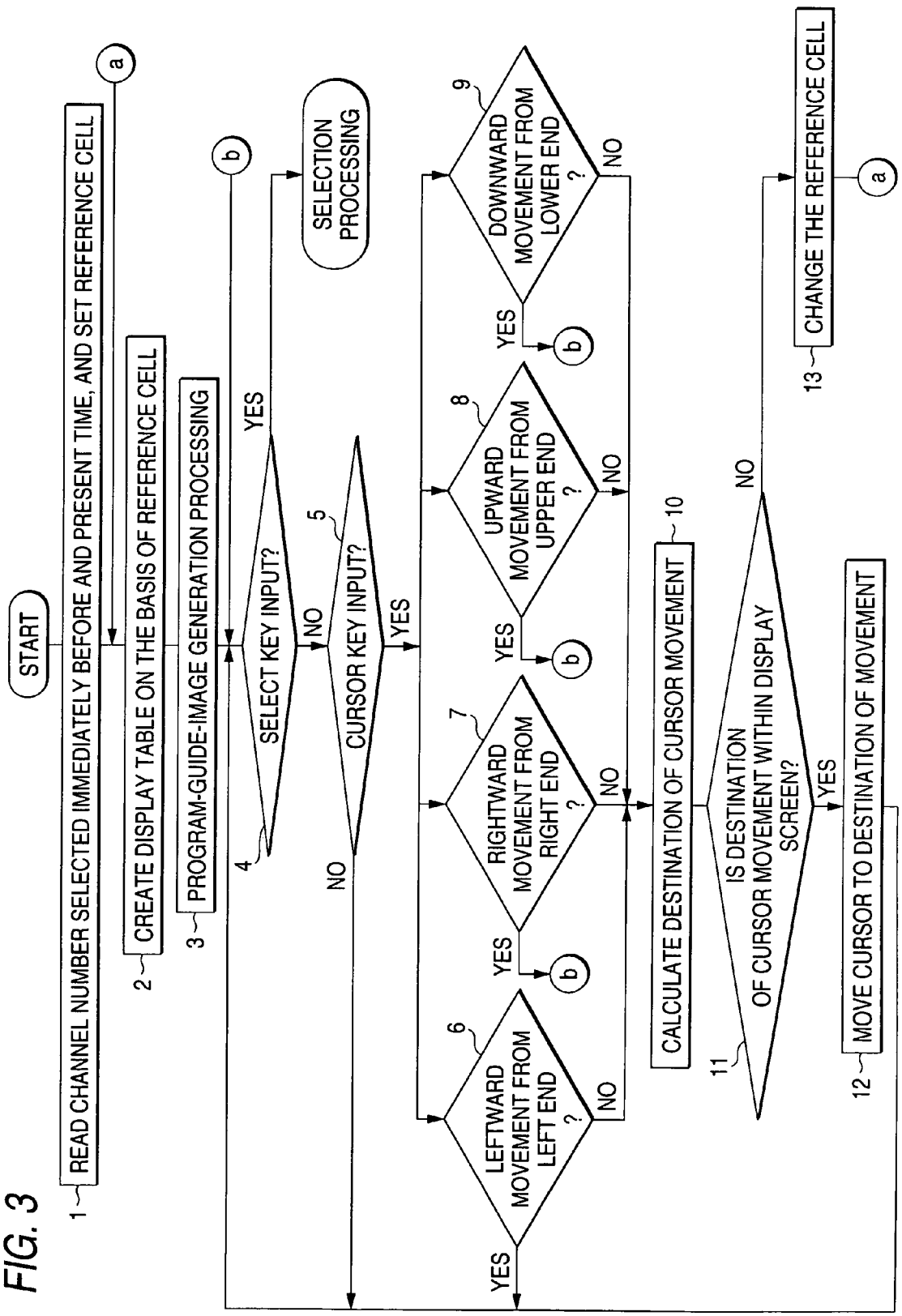
FIG. 3 is a flowchart illustrating an overall processing procedure for displaying a program guide screen.

Referring now to the drawings, a description will be given of an embodiment in a case where the present invention is applied to the digital satellite broadcasting system (DSS) which has been put to commercial use in the United States.

FIG. 1 shows a configuration of a user-side terminal. A combination of a television receiver and a program-guide-display controlling apparatus, or a television receiver incorporating a program-guide-display controlling circuit is used as the user-side terminal. The user-side terminal has a CPU 6 for controlling the overall user-side terminal. The CPU 6 has a storage device 9 for storing its program and necessary data. An operation unit 5 comprising a remote controller or the like is connected to the CPU 6. The CPU 6 controls a tuner 2 for displaying a program selected by the operation unit 5, and controls a program-guide-image generating circuit 4 for generating a program guide image.

A high-frequency signal from an unillustrated parabolic antenna is inputted to an input terminal 1. The signal inputted to the input terminal 1 is sent to the tuner 2. In the tuner, processing such as frequency conversion, QPSK demodulation and the like is effected, and a stream of digital video signals is generated. An output from the tuner 2 is sent to a video processing circuit 3.

In the video processing circuit 3, the stream outputted from the tuner 3 is MPEG decoded, and an analog video signal for displaying on a display unit 8 such as a CRT, e.g., an NTSC signal, is generated. This video signal is sent to the display unit 8 through a multiplexer 7 so as to be displayed on the display unit 8.

In the video processing circuit 3, program guide information is extracted from the output from the tuner 3, and is supplied to the CPU 6. The program guide information supplied to the CPU 6 is stored in the storage device 9. Set screen information for displaying various set screens such as a menu screen is stored in advance in the storage device 9, and information concerning programs which have been purchased (purchased programs) and the like are also stored therein.

The program-guide-screen generating circuit 4 has a display memory (not shown). In the program-guide-screen generating circuit 4, various set images and program guide images are formed on the display memory on the basis of the set screen information, the program guide information, and the like which are stored in the storage device 9. Then, the images formed on the display memory are consecutively read, and are sent to the display unit 8 through the multiplexer 7 so as to be displayed on the display unit 8. On the basis of a control signal from the CPU 6, the multiplexer 7 selects one of the output from the video processing circuit 3 and the output from the program-guide-image generating circuit 4, and supplies it to the display unit 8.

The operation unit 5 is provided with a menu key 11 for displaying the menu screen, four cursor movement keys 12L, 12R, 12U, and 12D for moving a cursor horizontally and vertically, a select key 13 for selecting and inputting, and the like. When the user wishes to view a program guide screen, it suffices if the user operates the menu key 11 to display the menu screen, and then selects a program guide by operating the cursor movement keys 12L, 12R, 12U, and 12D and the select key 13.

The program guide information sent to the receiver includes guide information on the programs for all the channels from the present time to the time 24 hours ahead, for example. The program guide information on one program includes a title, its fee (rate) if the program is a PPV program, the category (sports, music, drama, news, etc.), the starting time, the ending time, and so on.

Figures 9, 10:
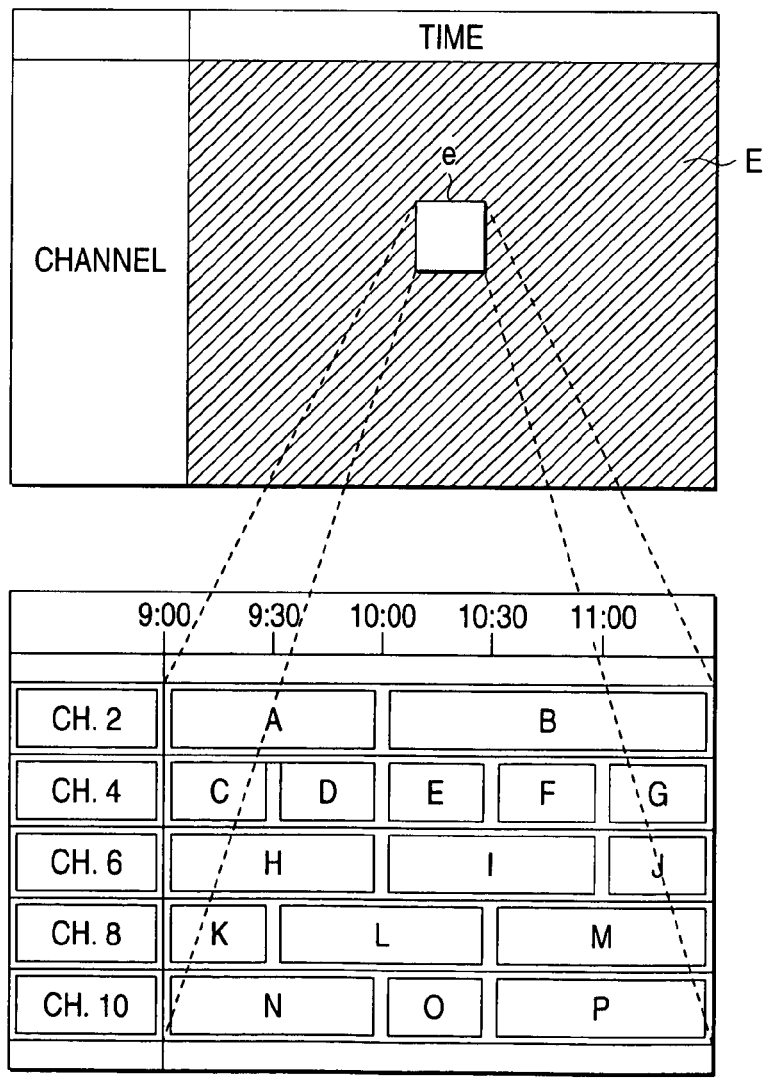
FIG. 9 is diagram illustrating an example of the program guide screen displayed on the basis of the program guide image formed by processing in FIG. 8.
FIG. 10 is a diagram illustrating the program guide screen displayed on the user-side terminal in DSS.

The CPU 6 regards the guide information on the programs for all the channels as being two-dimensionally arranged information in which the channel numbers are set in the vertical direction and the time is set in the horizontal direction as shown on the upper side in FIG. 10, and the CPU 6 generates an index table which can be accessed, by using the channel numbers and slot numbers indicating the time. The slot numbers are numbers which are allotted in units of 30 minutes, for example. Incidentally, the two-dimensionally arranged region corresponding to the entire program guide information shown on the upper side in FIG. 10 will be referred to as an entire program guide region.

If a program guide display is selected by the operation unit 5, the CPU 6 generates a display table such as the one shown in FIG. 2 on the basis of the channel number selected immediately before then, the present time, and the index table. In FIG. 2, the program guide display information is stored in small regions (hereafter referred to as cells) in the region excluding the leftmost column. Accordingly, in this example, a display table corresponding to a 5 channels×5 cells portion (corresponding to two hours and a half) of the program guide. The channel numbers (absolute channel numbers) or data on the station names corresponding to those channel numbers are stored in the cells in the leftmost column.

In FIG. 2, x in (x, y) described as an index in each cell denotes a relative channel number (a relative channel number among the slots in the display table, and not an absolute channel number), and y denotes a relative slot number (a relative slot number among the cells in the display table, and not an absolute slot number). The program guide display information corresponding to the channel number selected immediately before then and the present time is stored in a second cell So from the left in an uppermost row (hereafter this cell will be referred to as a reference cell).

The program guide display information stored in each slot includes a title, the number of cells in which the program continues (the number of exclusively occupied cells), the rate, information representing whether or not the program has been purchased, the category, and so on. On the basis of the display table thus created, the program-guide-image generating circuit 4 generates on the display memory an image corresponding to the program guide screen such as the one shown on the lower side in FIG. 10. Then, as the image generated on the display memory is sent to the display unit 8, the program guide screen such as the one shown on the lower side in FIG. 10 is displayed on the display unit 8.

FIG. 3 shows an overall procedure of processing which is executed by the CPU 6 and the program-guide-image generating circuit 4 in the case where the program guide is selected by the operation unit 5.

When the program guide is selected by the operation unit 5, the channel number selected immediately before then and the present time are read, and the reference cell is set in the entire program guide region (Step 1).

The display table shown in FIG. 2 is created on the basis of the set reference cell and the index table (Step 2).

Information in this display table is sent from the CPU 6 to the program-guide-image generating circuit 4. In the program-guide-image generating circuit 4, program-guide-image generation processing is effected on the basis of the sent information (Step 3). That is, a program guide image is generated on the display memory. As the program guide image generated on the display memory is consecutively read and sent to the display unit 8, a program guide screen is displayed on the display unit 8. Subsequently, the operation is set in a state of waiting for a key input.

When there has been a select key input by the select key 11 (YES in Step 4), predetermined selection processing such as the selection of a program, a reservation of a program, and the like is executed.

When there has been a cursor key input by the cursor movement keys 12L, 12R, 12U, and 12D (YES in Step 5), processing in Step 6, 7, or 9 is effected in correspondence with the operated cursor movement keys 12L, 12R, 12U, and 12D.

In other words, if the operated key is the left movement key 12L, the operation proceeds to Step 6 to determine whether or not there has been a command for leftward movement from the left end of the entire program guide region. If the operated key is the right movement key 12R, the operation proceeds to Step 7 to determine whether or not there has been a command for rightward movement from the right end of the entire program guide region. If the operated key is the upward movement key 12U, the operation proceeds to Step 8 to determine whether or not there has been a command for upward movement from the upper end of the entire program guide region. If the operated key is the downward movement key 12D, the operation proceeds to Step 9 to determine whether or not there has been a command for downward movement from the lower end of the entire program guide region.

The cursor cannot be moved if there has been a command for leftward movement from the left end of the entire program guide region (YES in Step 6), if there has been a command for rightward movement from the right end of the entire program guide region (YES in Step 7), if there has been a command for upward movement from the upper end of the entire program guide region (YES in Step 8), or if there has been a command for downward movement from the lower end of the entire program guide region (YES in Step 9). Hence, the operation returns to Step 4, and is set in a state of waiting for a key input.

If the cursor movement command by the cursor key input is not a command which cannot move the cursor as described above, the position of the destination of the cursor movement is calculated (Step 10). Then, a determination is made as to whether or not the position of the destination of the cursor movement is within the program guide screen being displayed on the display unit 8 (Step 11). If the position of the destination of the cursor movement is within the program guide screen being displayed on the display unit 8, the cursor image within the display memory is moved so that the cursor is displayed at the position of the destination of movement (Step 12).

If the position of the destination of the cursor movement is outside the program guide screen being displayed on the display unit 8, the slot corresponding to the position of the destination of cursor movement is set as the reference cell to change (scroll) the program guide screen (Step 13). Then, the operation returns to Step 2. Accordingly, the display table shown in FIG. 2 is created on the basis of the newly set reference slot, and a new program guide screen is displayed on the display unit 8. Namely, the program guide screen is updated.

Figures 4, 5:
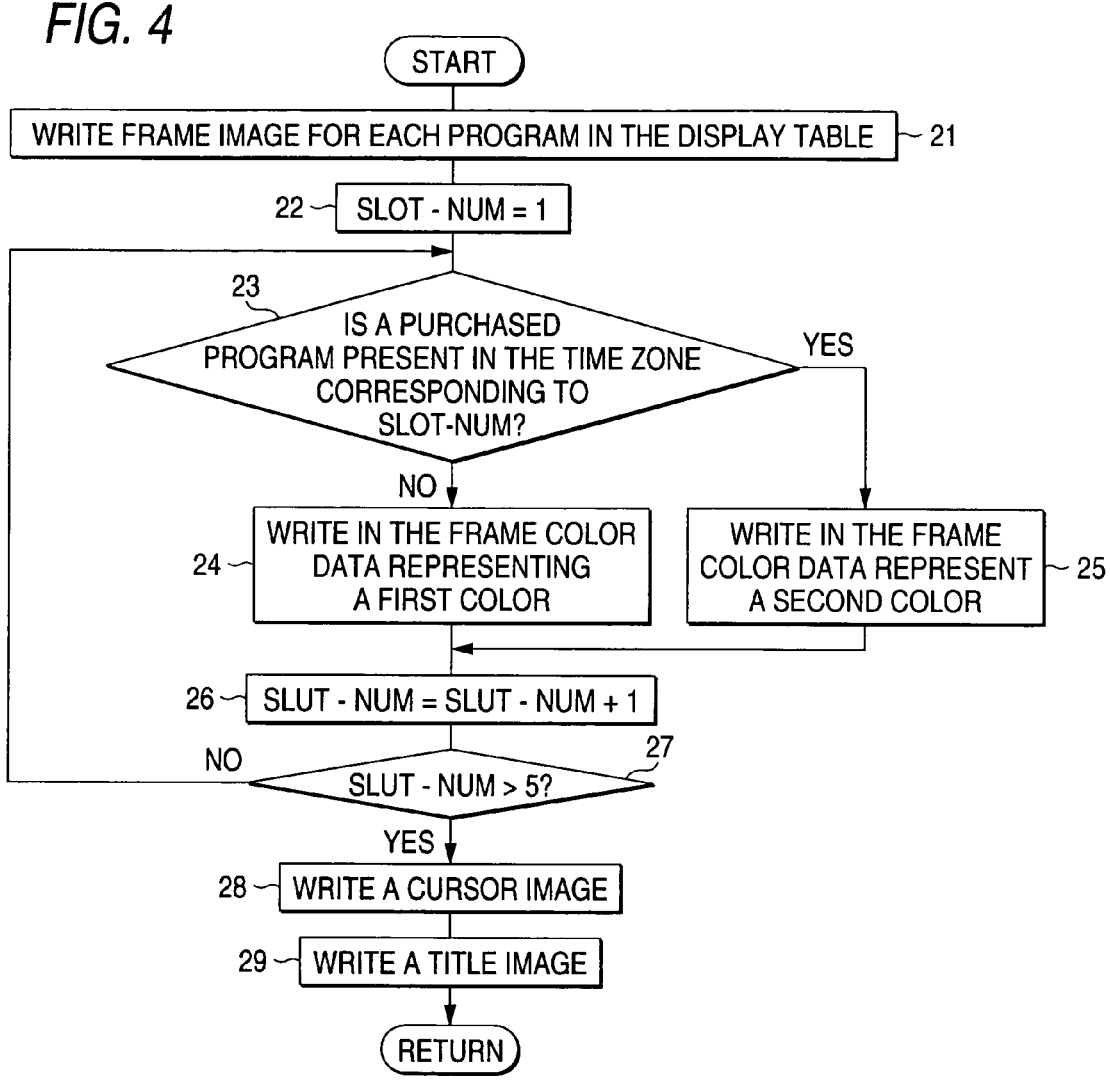
FIG. 4 is a flowchart illustrating a detailed procedure of program-guide-image generation processing in Step 3 shown in FIG. 3.
FIG. 5 is a diagram illustrating an example of the program guide screen displayed on the basis of a program guide image formed by processing in FIG. 4.

FIG. 4 shows a detailed procedure of program-guide-image generation processing in Step 3 shown in FIG. 3.

In this program-guide-image generation processing, as shown in FIG. 5, a program guide image is generated in which a time period in which purchased programs are present and a time period in which purchased programs are not present are displayed by being classified by coloring.

First, a frame image of a size corresponding to the number of its exclusively occupied cells is written in the display memory for each program within the display table (Step 21). Then, 1 is set in a variable SLOT-NUM which indicates a relative slot number (Step 22).

A determination is made as to whether or not a purchased program is present in the time period corresponding to the presently set variable SLOT-NUM (Step 23). If it is determined that a purchased program is not present in the time period corresponding to the presently set variable SLOT-NUM, color data representing a first color is written in the region of the time period corresponding to the presently set variable SLOT-NUM in the inner regions of all the frames which have been written in the display memory (Step 24). Then, the operation proceeds to Step 26.

In Step 23, if it is determined that a purchased program is present in the time period corresponding to the presently set relative slot number SLOT-NUM, color data representing a second color different from the first color is written in the region of the time period corresponding to the presently set variable SLOT-NUM in the inner regions of all the frames which have been written in the display memory (Step 25). Then, the operation proceeds to Step 26.

In Step 26, the variable SLOT-NUM is incremented by 1. That is, the variable SLOT-NUM is updated. Then, a determination is made as to whether or not the updated variable SLOT-NUM is greater than 5 (Step 27). If the updated variable SLOT-NUM is less than or equal to 5 (NO in Step 27), the operation returns to Step 23, and processing in Steps 23 to 26 is executed again with respect to the time period corresponding to the updated variable SLOT-NUM. If processing in Steps 23 to 26 is thus executed with respect to each of the relative slot numbers 1 to 5, YES is given as the answer in Step 27, and the operation proceeds to Step 28.

In Step 28, a cursor image is written in the display memory. Subsequently, an image representing a title (title image) is written in each frame (Step 29), whereupon the program-guide-image generation processing ends.

FIG. 5 shows an example of the program guide screen displayed on the display unit 8 on the basis of the program guide image thus formed. FIG. 5 shows an example in which already purchased programs are present in the time period 9:00 to 10:00. Accordingly, the interiors of the program frames in the time period 9:00 to 10:00 are colored in the second color (shown by hatching), and the interiors of the program frames in other time periods are colored in the first color (shown by black spaces).

Thus, in the above-described embodiment, since the time period in which purchased programs are present and the time period in which purchased programs are not present are classified by coloring, the user is able to immediately know the time period in which the purchased programs are present through the program guide screen. For this reason, it is possible to prevent two or more programs from being purchased by mistake during the same time period.

Incidentally, if an already purchased program is present among the programs which are written in the display memory, color data representing a third color different from the first and second colors may be written within the frame of that program.

Figure 6:
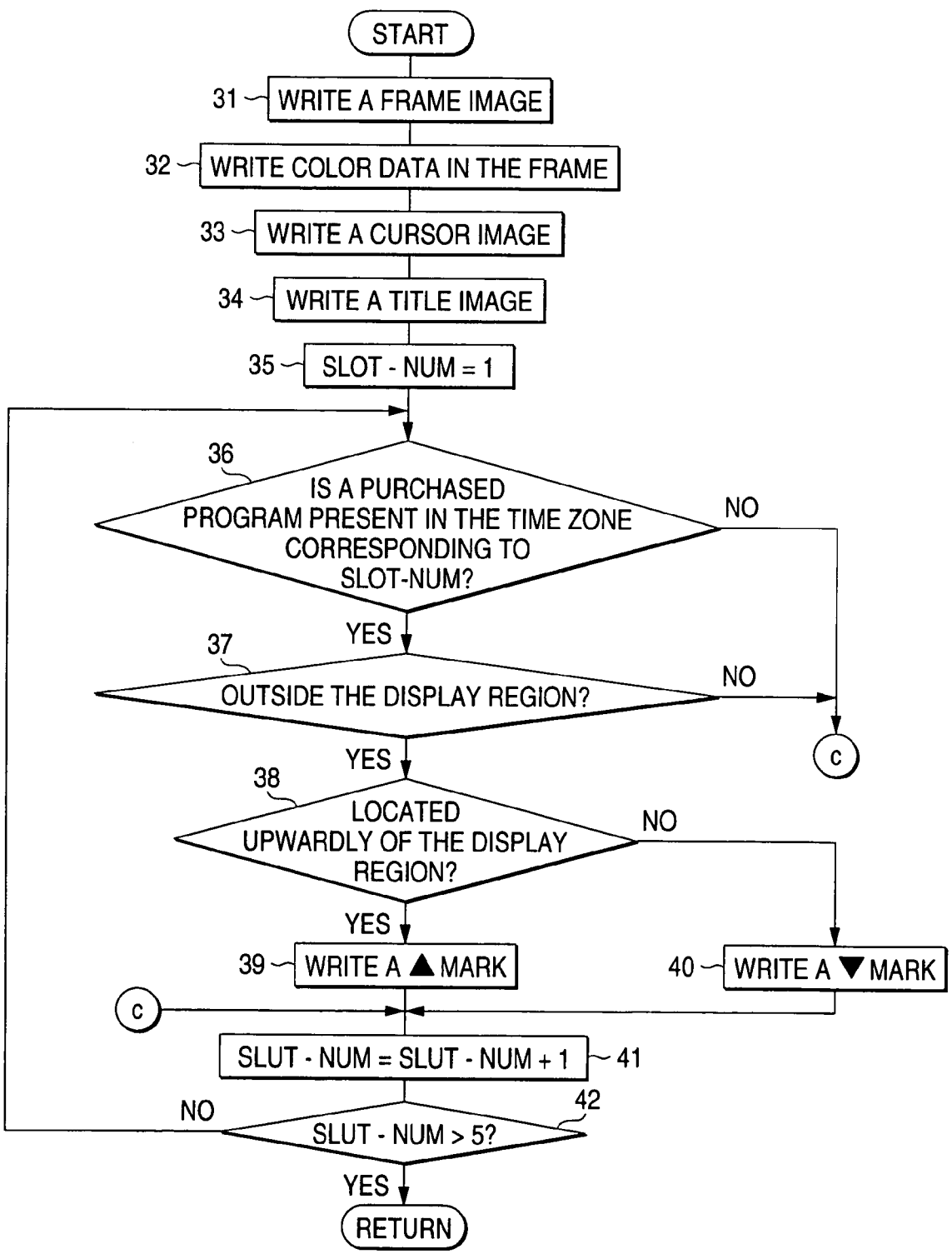
FIG. 6 is a flowchart illustrating another example of the program-guide-image generation processing.

FIG. 6 shows another example of the program-guide-image generation processing.

Figure 7:
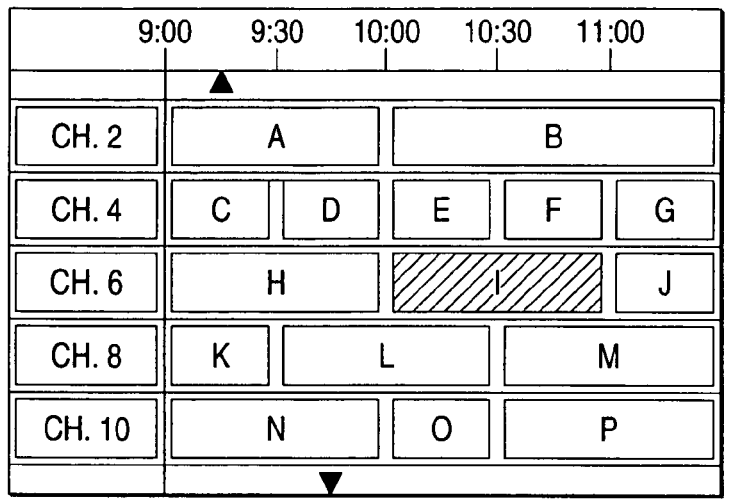
FIG. 7 is diagram illustrating an example of the program guide screen displayed on the basis of the program guide image formed by processing in FIG. 6.

In this program-guide-image generation processing, programs which have been purchased and programs which have not been purchased are classified by coloring, and a program guide image is generated in which the time period in which the purchased programs are present is indicated by triangular marks (Δ, ∇), as shown in FIG. 7.

First, a frame image of a size corresponding to the number of exclusively occupied slots of the program within the display table is written in the display memory (Step 31).

Next, the color data representing the first color is written in the frames corresponding to the programs which have not been purchased among all the frames which have been written in the display memory, while the color data representing the second color different from the first color is written in the frames corresponding to the programs which have been purchased (Step 32). If a purchased program is not present among the programs which are to be displayed in the display region, the color data representing the first color is written in the interiors of all the frames which have been written in the display memory.

Next, after the cursor image is written in the display memory (Step 33), a title image is written in each frame (Step 34).

Next, 1 is set in the variable SLOT-NUM which indicates the relative slot number (Step 35). Then, a determination is made as to whether or not any purchased program is present in the time period corresponding to the presently set variable SLOT-NUM (Step 36). If it is determined that a purchased program is not present in the time period corresponding to the presently set variable SLOT-NUM, the operation proceeds to Step 41.

If it is determined that a purchased program is present in the time period corresponding to the presently set variable SLOT-NUM, a determination is made as to whether or not the purchased program is present in the display region (Step 37). If the purchased program is present in the display region, the operation proceeds to Step 41.

If a purchased program is not present in the display region, a determination is made as to whether or not that purchased program is located upwardly of the display region (Step 38). If it is determined that the purchased program is located upwardly of the display region (YES in Step 38), an image corresponding to the upward oriented triangular mark Δ is written in the display memory so that the upward oriented triangular mark Δ will be displayed in an upper region of the display screen, this region being the region of the time period corresponding to the presently set relative slot number SLOT-NUM (Step 39). Then, the operation proceeds to Step 41.

If it is determined that the purchased program is not located upwardly of the display region (NO in Step 38), a determination is made that the purchased program is located downwardly of the display region. Accordingly, in this case, an image corresponding to the downward oriented triangular mark is written in the display memory so that the downward oriented triangular mark ∇ will be displayed in a lower region of the display screen, this region being the region of the time period corresponding to the presently set relative slot number SLOT-NUM (Step 40). Then, the operation proceeds to Step 41.

In Step 41, the variable SLOT-NUM is incremented by 1. That is, the variable SLOT-NUM is updated. Then, a determination is made as to whether or not the updated variable SLOT-NUM is greater than 5 (Step 42). If the updated variable SLOT-NUM is less than or equal to 5 (NO in Step 42), the operation returns to Step 36, and processing in Steps 36 to 41 is executed again with respect to the time period corresponding to the updated variable SLOT-NUM. If processing in Steps 36 to 41 is thus executed with respect to each of the relative slot numbers 1 to 5, YES is given as the answer in Step 27, and the program-guide-image generation processing ends.

FIG. 7 shows an example of the program guide screen displayed on the display unit 8 on the basis of the program guide image thus formed. In this example, the upward oriented triangular mark Δ is displayed at the time period 9:00 to 9:30, and the downward oriented triangular mark ∇ is displayed at the time period 9:30 to 10:00. In addition, a program during 10:00 to 11:00 on channel 6 (title: I) is colored in the second color.

Namely, during the time period of 9:00 to 9:30, an already purchased program is present on the channel which is located upwardly of the channels being displayed. In addition, during the time period of 9:30 to 10:00, an already purchased program is present on the channel which is located downwardly of the channels being displayed. Further, the program during 10:00 to 11:00 on channel 6 (title: I) is an already purchased program.

In this embodiment, programs which have been purchased and programs which have not been purchased are displayed on the program guide screen by being classified by coloring, and the time period in which a purchased program is located upwardly of the display screen and the time period in which a purchased program is located downwardly of the display screen are displayed by the triangular marks. Accordingly, the user is able to immediately know the time period in which the purchased programs are present through the program guide screen. For this reason, it is possible to prevent two or more programs from being purchased by mistake during the same time period. In addition, if the triangular mark is displayed, the user is able to know if the purchased program is on the channel located upwardly or downwardly of the program guide screen being presently displayed, so that it is easy to search a purchased program through the operation of the cursor.

Figure 8:
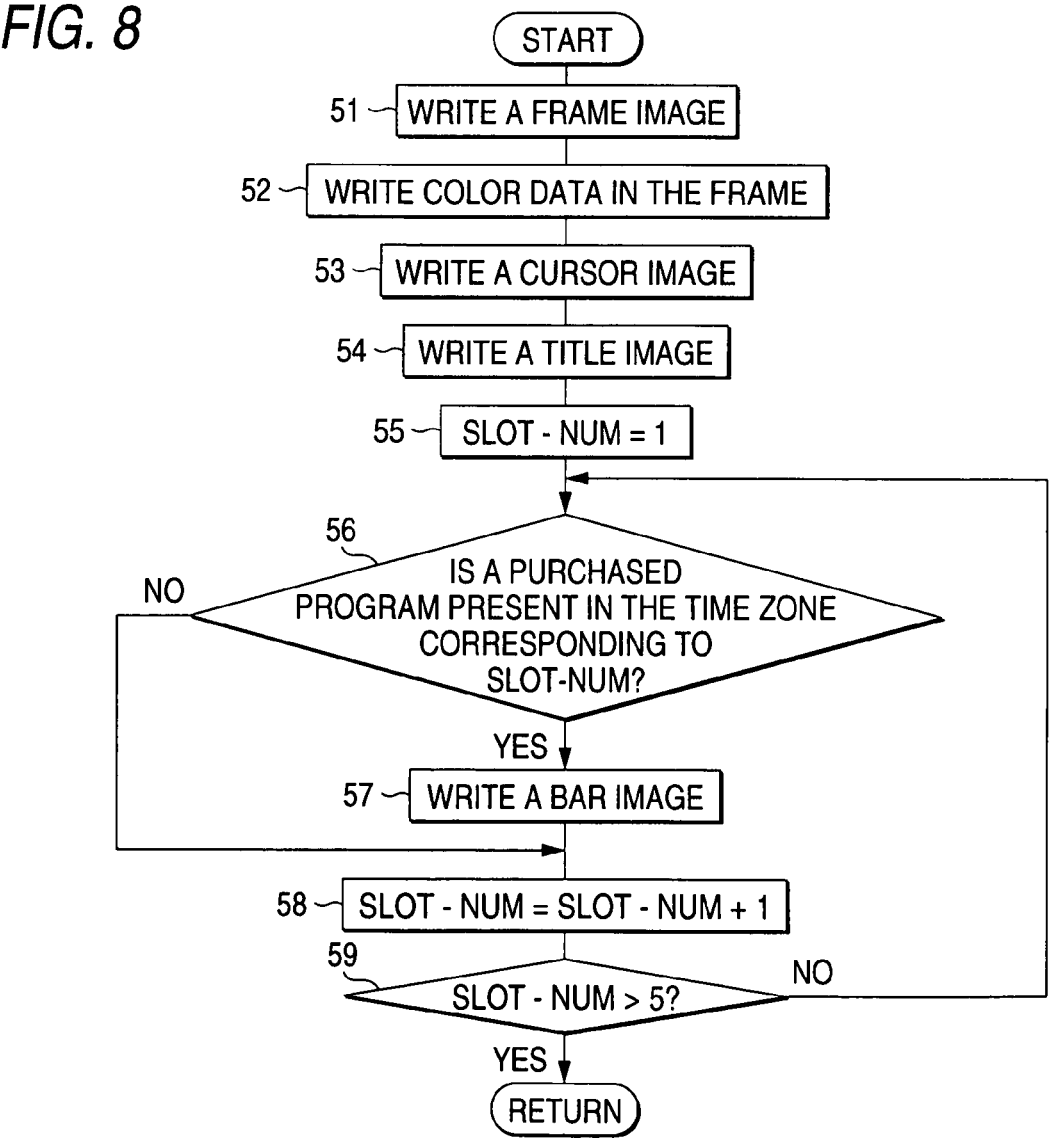
FIG. 8 is a flowchart illustrating still another example of the program-guide-image generation processing.

FIG. 8 shows still another example of the program-guide-image generation processing. In this program-guide-image generation processing, a program guide image is generated in which the time period in which the purchased programs are present is indicated by a bar, as shown in FIG. 9.

First, a frame image of a size corresponding to the number of exclusively occupied cells of the program within the display table is written in the display memory (Step 51).

Next, color data representing a predetermined color is written in all the frames which have been written in the display memory (Step 52). Incidentally, if an already purchased program is present among programs which are written in the display memory, the color data representing the first color may be written in the frames corresponding to the programs which have not been purchased among all the frames which have been written in the display memory, while the color data representing the second color different from the first color may be written in the frames corresponding to the programs which have been purchased.

Next, after the cursor image is written in the display memory (Step 53), a title image is written in each frame (Step 54).

Next, 1 is set in the variable SLOT-NUM which indicates the relative slot number (Step 55). Then, a determination is made as to whether or not any purchased program is present in the time period corresponding to the presently set variable SLOT-NUM (Step 56). If it is determined that a purchased program is not present in the time period corresponding to the presently set variable SLOT-NUM, the operation proceeds to Step 58.

If it is determined that a purchased program is present in the time period corresponding to the presently set variable SLOT-NUM, an image corresponding to a bar is written in the display memory so that the bar will be displayed in an upper region of the display screen, this region being the region of the time period corresponding to the presently set relative slot number SLOT-NUM (Step 57). Then, the operation proceeds to Step 58.

In Step 58, the variable SLOT-NUM is incremented by 1. That is, the variable SLOT-NUM is updated. Then, a determination is made as to whether or not the updated variable SLOT-NUM is greater than 5 (Step 59). If the updated variable SLOT-NUM is less than or equal to 5 (NO in Step 59), the operation returns to Step 56, and processing in Steps 56 to 58 is executed again with respect to the time period corresponding to the updated variable SLOT-NUM. If processing in Steps 56 to 58 is thus executed with respect to each of the relative slot numbers 1 to 5, YES is given as the answer in Step 59, and the program-guide-image generation processing ends.

FIG. 9 shows an example of the program guide screen displayed on the display unit 8 on the basis of the program guide image thus formed. In this example, the bar is displayed in the upper region of the program guide screen, this region corresponding to the time period 9:00 to 10:00. Namely, an example is shown in which a purchased program is present in the time period 9:00 to 10:00.

In this embodiment, since the time period in which a purchased program is present is indicated by the bar on the program guide screen, it is possible to prevent two or more programs from being purchased by mistake during the same time period.

Next, a description will be given of an arrangement which makes it possible for the user to set a time period during which the user wishes to view television programs, and which makes it possible for the user to recognize that the program guide on programs which are broadcast during the set time period is the program guide on programs which are broadcast during the time period set by the user.

If a time-zone setting mode is selected on the menu screen, a time-zone setting screen is displayed for setting the time period during which the user wishes to view and so on, as shown in FIG. 11. If the user sets on the time-zone setting screen the starting time and the ending time of a time period during which the user wishes to view television programs, and then selects an OK button, data on the starting time and the ending time of the time period set by the user (hereafter, this data will be referred to as the time period data) is stored in the storage device 9. In addition, the display screen is changed over from the time-zone setting screen to the menu screen.

When the setting of the time period has been made, the program guide screen is displayed so that the time period set by the user and the other time periods can be discriminated from each other. For example, the region corresponding to the time period set by the user and the region corresponding to the other time periods are displayed in different colors in the display region of the program guide screen, as shown in FIG. 12. FIG. 12 illustrates a case in which the time period 12:00 to 24:00 has been set by the user.

In the processing for displaying in FIG. 12, the program-guide-image generation processing shown in FIG. 3 differs from that of the foregoing embodiment. Namely, if the time period has been set by the user, the region corresponding to the time period set by the user and the region corresponding to the other time periods are displayed in different colors in the display region of the program guide screen, as shown in FIG. 12. Subsequently, the operation is set in a state of waiting for a key input.

When there has been a select key input by the select key 13 (YES in Step 4), predetermined selection processing such as the selection of a program, a reservation of a program, and the like is executed.

When there has been a cursor key input by the cursor movement keys 12L, 12R, 12U, and 12D (YES in Step 5), processing in Step 6, 7, or 9 is effected in correspondence with the operated cursor movement keys 12L, 12R, 12U, and 12D.

In other words, if the operated key is the left movement key 12L, the operation proceeds to Step 6 to determine whether or not there has been a command for leftward movement from the left end of the entire program guide region E. If the operated key is the right movement key 12R, the operation proceeds to Step 7 to determine whether or not there has been a command for rightward movement from the right end of the entire program guide region E. If the operated key is the upward movement key 12U, the operation proceeds to Step 8 to determine whether or not there has been a command for upward movement from the upper end of the entire program guide region E. If the operated key is the downward movement key 12D, the operation proceeds to Step 9 to determine whether or not there has been a command for downward movement from the lower end of the entire program guide region E.

The cursor cannot be moved if there has been a command for leftward movement from the left end of the entire program guide region E (YES in Step 6), if there has been a command for rightward movement from the right end of the entire program guide region E (YES in Step 7), if there has been a command for upward movement from the upper end of the entire program guide region E (YES in Step 8), or if there has been a command for downward movement from the lower end of the entire program guide region E (YES in Step 9), i.e., if the command is for movement outside the entire program guide region E. Hence, the operation returns to Step 4, and is set in a state of waiting for a key input.

If the cursor movement command by the cursor key input is a command for movement within the entire program guide region, the position of the destination of the cursor movement is calculated (Step 10). If the cursor movement command is a command for horizontal movement, the position of the destination of the cursor movement is calculated by setting the amount of movement as a one-cell portion (one-slot portion) in the horizontal direction. If the cursor movement command is a command for vertical movement, the position of the destination of the cursor movement is calculated by setting the amount of movement as a one-cell portion (one-slot portion) in the vertical direction.

Then, a determination is made as to whether or not the position of the destination of the cursor movement is within the program guide screen being displayed on the display unit 8 (Step 11).

If the position of the destination of the cursor movement is within the program guide screen being displayed on the display unit 8, the cursor image within the display memory is moved so that the cursor is displayed at the position of the destination of movement (Step 12).

If the position of the destination of the cursor movement is outside the program guide screen being displayed on the display unit 8, processing for changing the reference cell is effected to change (scroll) the program guide screen (Step 13). In this processing for changing the reference cell, the position which is spaced apart the amount of cursor movement in the cursor moving direction from the present reference cell is set as a new reference cell in the entire program guide region E. After the new reference cell is set by the processing for changing the reference cell, the operation returns to Step 2. Accordingly, the display table shown in FIG. 2 is created on the basis of the newly set reference cell, and a new program guide screen is displayed on the display unit 8. Namely, the program guide screen is updated.

Figure 13:
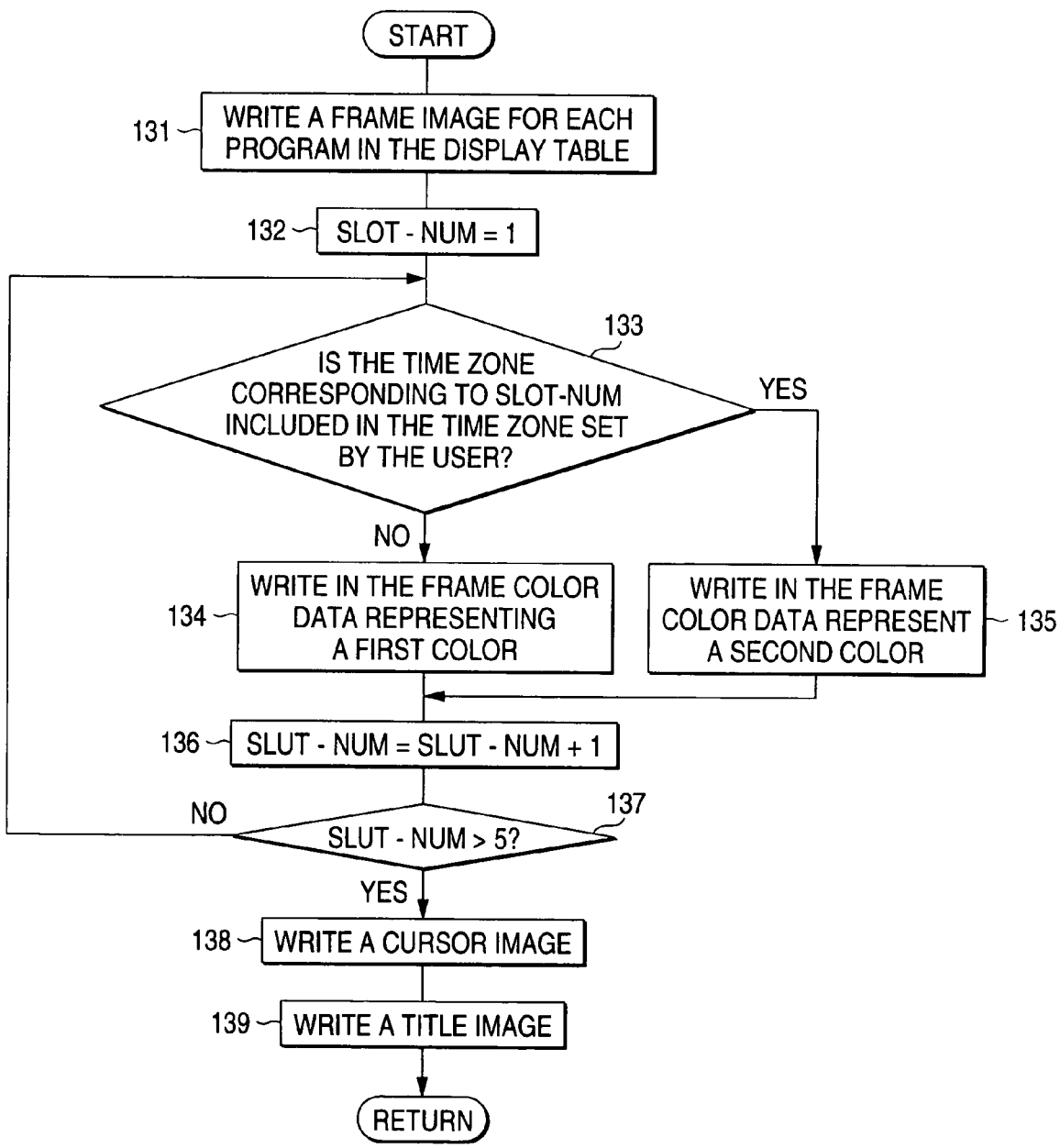
FIG. 13 is a flowchart illustrating a detailed procedure of the program-guide-image generation processing which is executed in the case where the time period has been set by the user.

FIG. 13 shows a detailed procedure of the program-guide-image generation processing (Step 3 shown in FIG. 3) in the case where the time period has been set by the user.

First, a frame image of a size corresponding to the occupying time of each program is written in the display memory for each program within the display table on the basis of the number of the exclusively occupied cells (Step 131). Then, 1 is set in a variable SLOT-NUM which indicates a relative slot number (Step 132).

Next, on the basis of the time period data stored in the storage device 9, a determination is made as to whether or not the time period corresponding to the presently set variable SLOT-NUM is included in the time period set by the user (Step 133). If it is determined that the time period corresponding to the presently set variable SLOT-NUM is not included in the time period set by the user, color data representing a first color is written in the region of the time period corresponding to the presently set variable SLOT-NUM in the inner regions of all the frames which have been written in the display memory (Step 134). Then, the operation proceeds to Step 136.

In Step 133, if it is determined that the time period corresponding to the presently set variable SLOT-NUM is included in the time period set by the user, color data representing a second color different from the first color is written in the region of the time period corresponding to the presently set variable SLOT-NUM in the inner regions of all the frames which have been written in the display memory (Step 135). Then, the operation proceeds to Step 136.

In Step 136, the variable SLOT-NUM is incremented by 1. That is, the variable SLOT-NUM is updated. Then, a determination is made as to whether or not the updated variable SLOT-NUM is greater than 5 (Step 137). If the updated variable SLOT-NUM is less than or equal to 5 (NO in Step 137), the operation returns to Step 133, and processing in Steps 133 to 136 is executed again with respect to the time period corresponding to the updated variable SLOT-NUM. If processing in Steps 133 to 136 is thus executed with respect to each of the relative slot numbers 1 to 5, YES is given as the answer in Step 137, and the operation proceeds to Step 138.

In Step 138, a cursor image is written in the display memory. Subsequently, an image representing a title (title image) is written in each frame (Step 139), whereupon the program-guide-image generation processing ends.

If the time period has not been set by the user, the color data representing the same color is written in all the frames which have been written in the display memory in Step 131.

The time period during which the user wishes to view programs may be set for each day of the week. In the case where time period during which the user wishes to view programs is set for each day of the week, a time-zone setting screen such as the one shown in FIG. 14 is used. If the user sets on this time-zone setting screen the starting time and the ending time of the time period during which the user wishes to view programs on each day of the week, and then selects the OK button, data on the starting time and the ending time of the time period set for each day of the week (hereafter, this data will be referred to as the time period data) is stored in the storage device 9. If the time period during which the user wishes to view programs has been set for each day of the week, the programs are classified by coloring on the basis of the time period data for the present day of the week.

Although in the above-described embodiment only one time period is set for one day, a plurality of time periods may be set for one day.

In the above-described embodiment, the region corresponding to the time period set by the user and the region corresponding to the other time periods are displayed in different colors in the display region of the program guide screen. Accordingly, since the time period which has been set by the user can be recognized at a glance, it is readily possible to effect the purchase by prescription or the like of PPV programs which are broadcast during that time period.

Next, a description will be given of an arrangement for displaying the present time on the program guide screen.

The CPU 6 effects interrupt processing each time the program guide information is sent thereto. In this interrupt processing, on the basis of the program-guide-information changing information included in the program guide information a determination is made as to whether or not the program guide information has been changed. If it is determined that the program guide information has been changed, a program-guide-information change flag FA for storing that the program guide information has been changed is set (FA=1). In addition, the program guide information stored in the storage unit 9 is updated, and the index table is also updated.

Further, in the interrupt processing, a determination is made as to whether or not the time information received previously and the time information received this time are different. If it is determined that the time information received previously and the time information received this time are different, a time-information change flag FB for storing that the time information has been changed is set (FB=1). In addition, the time information stored in the storage unit 9 is updated.

Figure 15:
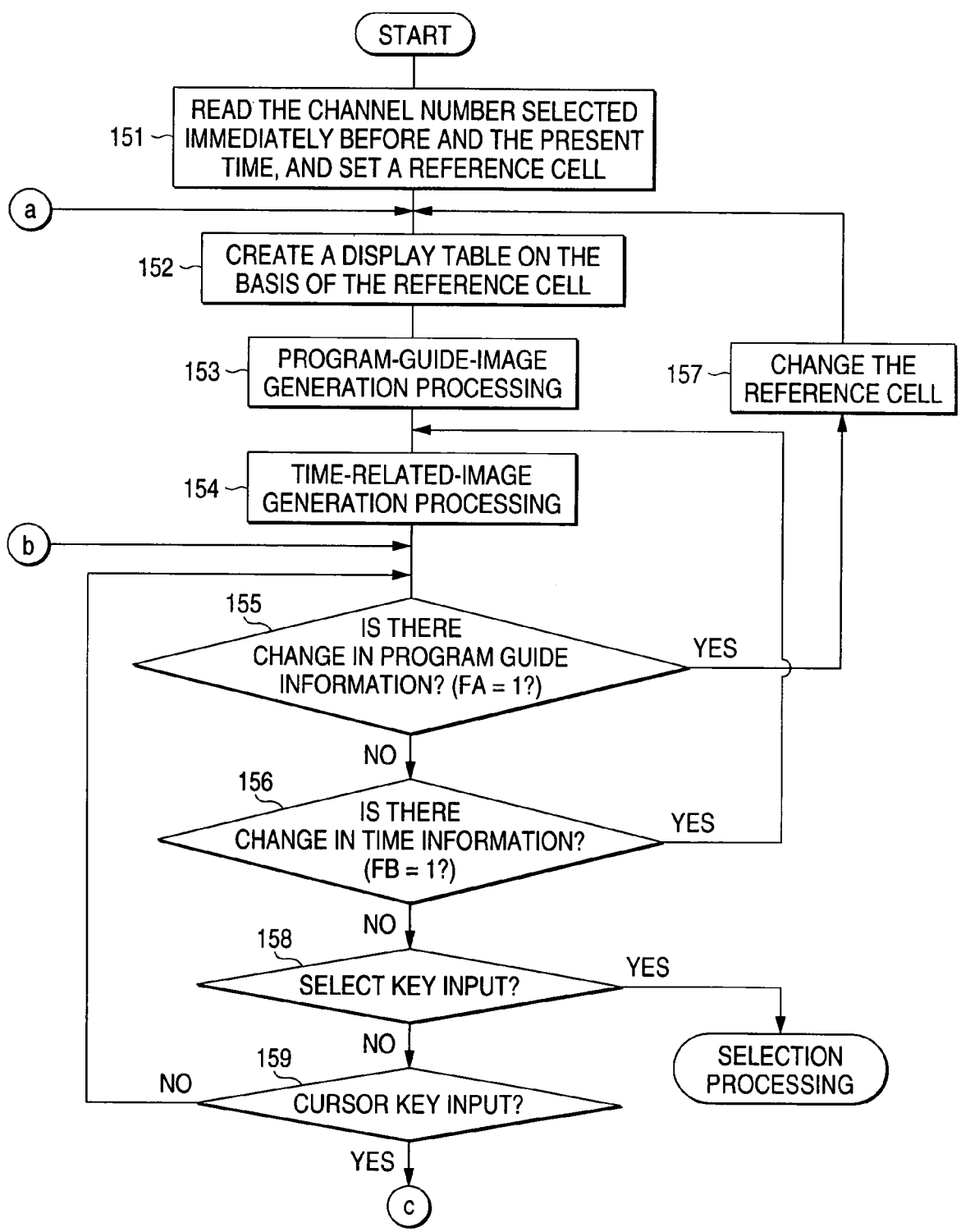
FIG. 15 is a flowchart illustrating a part of the processing procedure for displaying the program guide screen.
Figure 16:
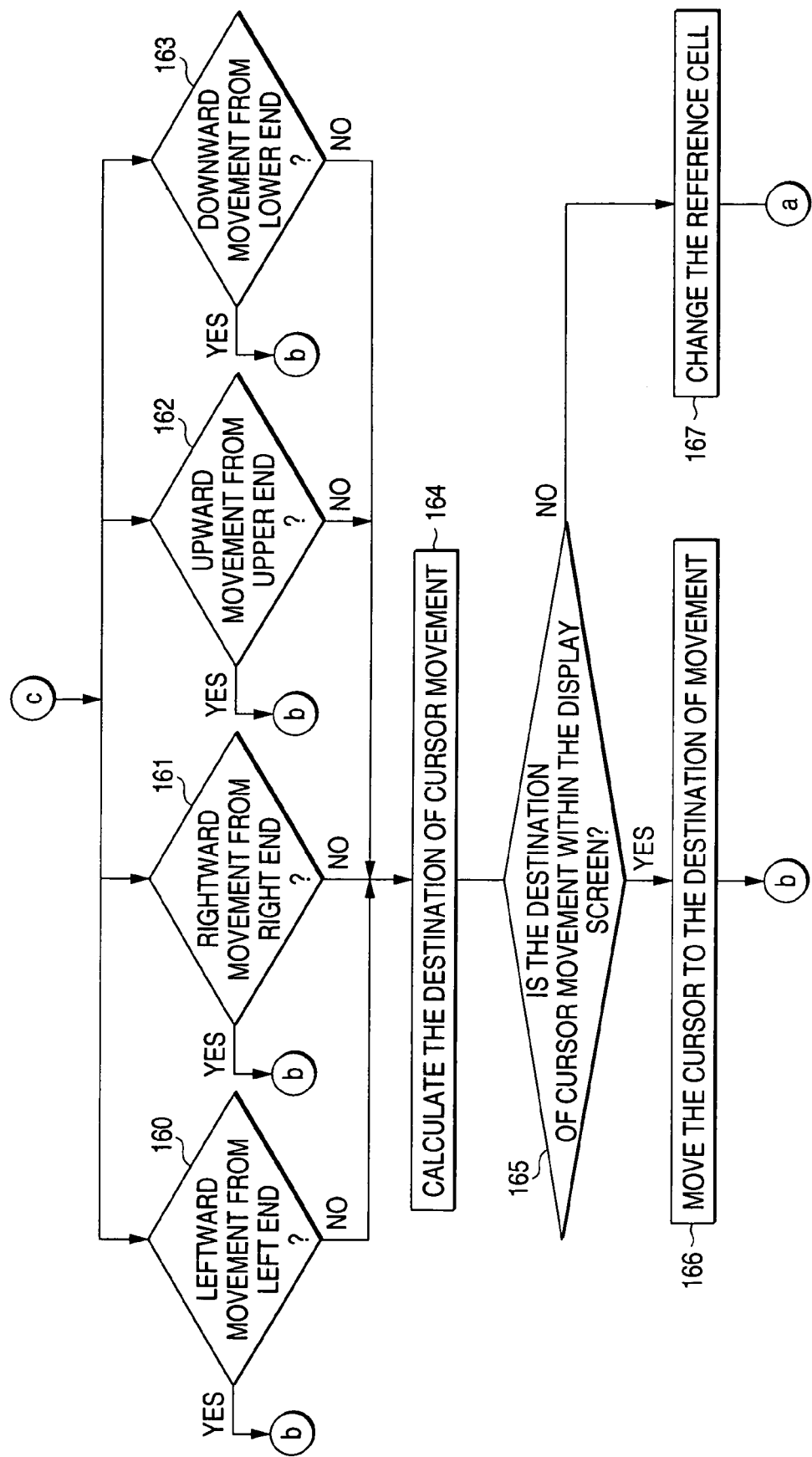
FIG. 16 is a flowchart illustrating another part of the processing procedure for displaying the program guide screen.

FIGS. 15 and 16 show a procedure of processing for displaying the program guide screen which is executed by the CPU 6 and the program-guide-image generating circuit 4. When the program guide is selected by the operation unit 5, the channel number selected immediately before then and the present time are read, and the reference cell is set in the entire program guide region E (see FIG. 10) (Step 151).

The display table shown in FIG. 2 is created on the basis of the set reference cell and the index table (Step 152).

Information in this display table is sent from the CPU 6 to the program-guide-image generating circuit 4. In the program-guide-image generating circuit 4, program-guide-image generation processing is effected on the basis of the information sent thereto (Step 153). Namely, a program guide image is generated on the display memory. As the program guide image generated on the display memory is consecutively read and is sent to the display unit 8, the program guide screen is displayed on the display unit 8. A description will be given later of the details of the program-guide-image generation processing.

In addition, time-related-image generation processing is effected (Step 154). Namely, the present time is digitally displayed at an upper left portion of the display screen, and a triangular mark Δ is displayed in a lower region of the display screen at the position corresponding to the present time. A description will be given later of the details of the time-related-image generation processing.

Next, a determination is made as to whether or not the program-guide-information change flag FA has been set (Step 155). If the program-guide-information change flag FA has not been set, a determination is made as to whether or not time-information change flag FB has been set (Step 156). If the time-information change flag FB has not been set, a determination is made as to whether or not there has been a select key input by the select key 13 (Step 158). If there has been no select key input by the select key 13, a determination is made as to whether or not there has been a cursor key input by the cursor movement keys 12L, 12R, 12U, and 12D (Step 159). If there has been no cursor key input by the cursor movement keys 12L, 12R, 12U, and 12D, the operation returns to Step 5. Then, processing in Steps 155, 156, 158, and 159 is repeated until a key input is made.

If there has been a select key input by the select key 13 (YES in Step 158), predetermined selection processing such as the selection of a program, a reservation of a program, and the like is executed.

If there has been a cursor key input by the cursor movement keys 12L, 12R, 12U, and 12D (YES in Step 159), processing in Step 160, 161, 162, or 163 is effected in correspondence with the operated cursor movement key 12L, 12R, 12U, or 12D.

Namely, the operated key is the left movement key 12L, the operation proceeds to Step 160 to determine whether or not there has been a command for leftward movement from the left end of the entire program guide region E. If the operated key is the right movement key 12R, the operation proceeds to Step 161 to determine whether or not there has been a command for rightward movement from the right end of the entire program guide region E. If the operated key is the upward movement key 12U, the operation proceeds to Step 162 to determine whether or not there has been a command for upward movement from the upper end of the entire program guide region E. If the operated key is the downward movement key 12D, the operation proceeds to Step 163 to determine whether or not there has been a command for downward movement from the lower end of the entire program guide region E.

The cursor cannot be moved if there has been a command for leftward movement from the left end of the entire program guide region E (YES in Step 160), if there has been a command for rightward movement from the right end of the entire program guide region E (YES in Step 161), if there has been a command for upward movement from the upper end of the entire program guide region E (YES in Step 162), or if there has been a command for downward movement from the lower end of the entire program guide region E (YES in Step 163), i.e., if the command is for movement outside the entire program guide region E. Therefore, the operation returns to Step 155.

If the cursor movement command by the cursor key input is a command for movement within the entire program guide region, the position of the destination of the cursor movement is calculated (Step 164). If the cursor movement command is a command for horizontal movement, the position of the destination of the cursor movement is calculated by setting the amount of movement as a one-cell portion (one-slot portion) in the horizontal direction. If the cursor movement command is a command for vertical movement, the position of the destination of the cursor movement is calculated by setting the amount of movement as a one-cell portion (one-slot portion) in the vertical direction.

Then, a determination is made as to whether or not the position of the destination of the cursor movement is within the program guide screen being displayed on the display unit 8 (Step 165).

If the position of the destination of the cursor movement is within the program guide screen being displayed on the display unit 8, the cursor image within the display memory is moved so that the cursor is displayed at the position of the destination of movement (Step 166). Then, the operation returns to Step 155.

If the position of the destination of the cursor movement is outside the program guide screen being displayed on the display unit 8, processing for changing the reference cell is effected to change (scroll) the program guide screen (Step 167). In this processing for changing the reference cell, the position which is spaced apart the amount of cursor movement in the cursor moving direction from the present reference cell is set as a new reference cell in the entire program guide region E. After the new reference cell is set by the processing for changing the reference cell, the operation returns to Step 152. Accordingly, the display table shown in FIG. 2 is created on the basis of the newly set reference cell, and a new program guide screen is displayed on the display unit 8. Namely, the program guide screen is updated.

In a case where the program guide screen is being displayed, if the operation is set in a state of waiting for a key input by the operator, processing in Steps 155, 156, 158, and 159 has been repeated. Therefore, if the program-guide-information change flag FA is set (FA=1) by interrupt processing by the CPU 6 while the program guide screen is being displayed, YES is given as the answer in Step 155, and the operation proceeds to Step 157. When the operation has proceeded from Step 155 to Step 157, the time information representing the present time should have also been updated. In Step 157, the reference cell is updated on the basis of the present time represented by the updated time information and the channel number selected immediately before then.

Specifically, the reference cell is moved by a one-cell portion in the direction in which the time proceeds (in the rightward direction). Then, the operation returns to Step 152 to effect the processing for creating the display table and the program-guide-image generation processing. That is, if the program-guide-information change flag FA is set (FA=1) by interrupt processing while the program guide screen is being displayed, the program guide image is updated. Incidentally, the program-guide-information change flag FA is reset in the program-guide-image generation processing, as will be described later.

Meanwhile, if the time-information change flag FB is set (FB=1) by interrupt processing by the CPU 6 while the program guide screen is being displayed, YES is given as the answer in Step 156, and the operation returns to Step 154 to effect the time-related-image generation processing. That is, if the time-information change flag FB is set (FB=1) by interrupt processing while the program guide screen is being displayed, the time-related image is updated. It should be noted that the time-information change flag FB is reset in the time-related-image generation processing, as will be described later.

Figure 17:
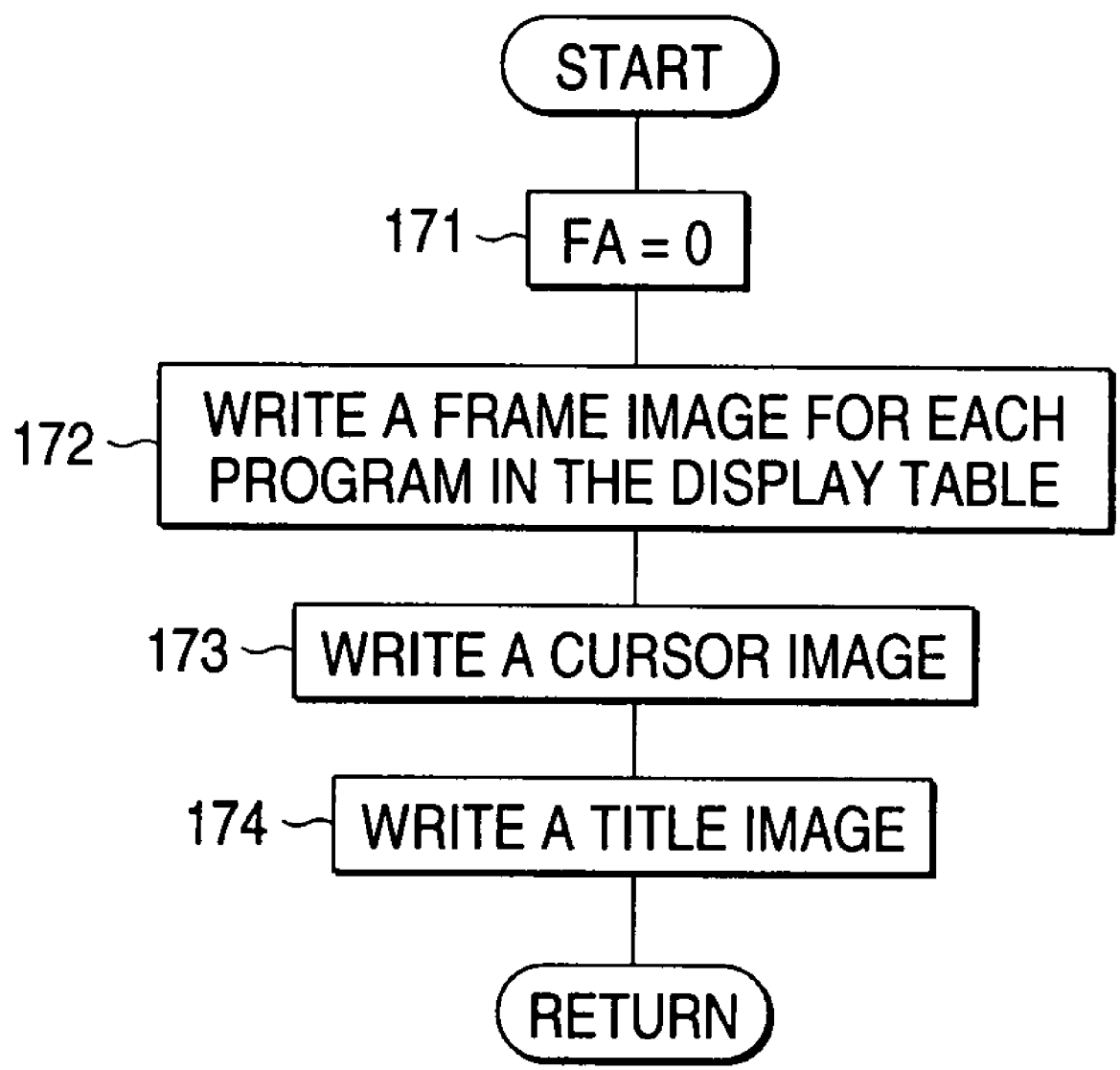
FIG. 17 is a flowchart illustrating a detailed procedure of the program-guide-image generation processing in Step 153 shown in FIG. 15.

FIG. 17 shows a detailed procedure of the program-guide-image generation processing in Step 153 shown in FIG. 15. First, the program-guide-information change flag FA is reset (FA=0) (Step 171). Cases where the program-guide-information change flag FA is changed from the set state to the reset state include: a case where the program-guide-information change flag FA has already been set when the display of the program guide screen is selected, and the operation has proceeded to Step 153 through Steps 151 and 152; and a case where the program-guide-information change flag FA is set while the program guide screen is being displayed, and the operation has proceeded to Step 153 through Steps 155, 157, and 152.

Next, a frame image of a size corresponding to the occupying time of each program is written in the display memory for each program within the display table on the basis of the number of the exclusively occupied cells (Step 172). Next, a cursor image is written in the display memory (Step 173). Subsequently, an image representing a title (title image) is written in each frame (Step 174). This completes the program-guide-image generation processing for the present occasion.

Figures 18, 19:
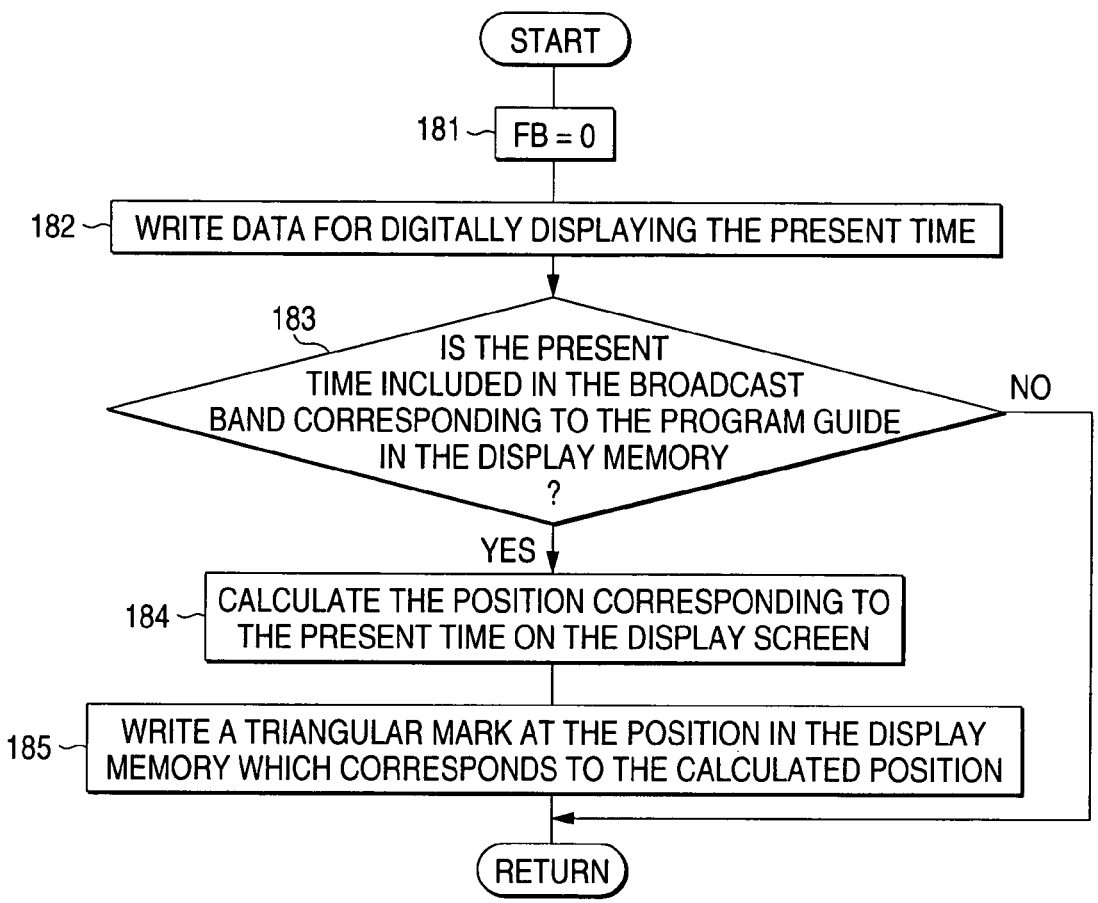
FIG. 18 is a flowchart illustrating a detailed procedure of time-related-image generation processing in Step 154 shown in FIG. 15.
FIG. 19 is a diagram illustrating a example of the program guide screen.

FIG. 18 shows a detailed procedure of the time-related-image generation processing in Step 154 shown in FIG. 15. First, the time-information change flag FB is reset (FB=0) (Step 181). Cases where the time-information change flag FB is changed from the set state to the reset state include: a case where the time-information change flag FB has already been set when the display of the program guide screen is selected, and the operation has proceeded to Step 154 through Steps 151, 152, and 153; and a case where the time-information change flag FB is set while the program guide screen is being displayed, and the operation has proceeded to Step 154 through Step 156.

Next, numerical values and a code are written in the display memory for digitally displaying the present time at an upper left portion of the display screen (Step 182).

Incidentally, the present time is specified by the time information sent from a transmitting side. Then, a determination is made as to whether or not the present time is included in a broadcast time period corresponding the program guides stored in the display memory (Step 183).

If it is determined that the present time is included in the broadcast time period corresponding the program guides stored in the display memory, the position which is in the lower region of the display screen and corresponds to the present time is calculated (Step 184), and the triangular mark A is written at the position in the display memory which correspond to the calculated position (Step 35). This completes the program-guide-image generation processing for the present occasion. As a result, the program guide screen such as the one shown in FIG. 19 is displayed on the display unit 8.

If it is determined in the aforementioned Step 183 that the present time is not included in the broadcast time period corresponding the program guides stored in the display memory, the program-guide-image generation processing for the present occasion ends without effecting processing in Steps 184 and 185.

In the above-described embodiment, since the triangular mark Δ is displayed at the position which is in the lower region of the display screen and corresponds to the present time as shown in FIG. 19, it is possible to recognize at a glance the elapsed time after the starting of the broadcast of the program being presently broadcast. For this reason, a situation is difficult to occur in which a PPV program is selected and viewed without recognizing the elapsed time after the starting of the broadcast of the PPV program.

INDUSTRIAL APPLICABILITY

As described above, in accordance with the present invention, since display is provided in the program guide display such that the time period for which the user made a purchase by subscription and the time period designated by the user can be discriminated, the situation is made unlikely to occur in which two or more PPV programs which are broadcast during the same time period happen to be purchased, or such a display can be used as a rough criterion as to whether or not a PPV program or the like is to be purchased.

The invention claimed is:

1. A program-guide-display controlling apparatus comprising:
    means for displaying a plurality of program guides on a display unit in a matrix form by using one of the ordinate and the abscissa as a channel number axis and another one as a time axis;
    means for determining whether any of a plurality of time periods includes a purchased one of a plurality of purchasable programs, wherein a first of the plurality of time periods begins immediately after a second of the plurality of time periods ends; and
    means for distinguishing on the display unit between the time periods which include a purchased one of the plurality of purchasable programs and the time periods which do not include any purchased one of the plurality of purchasable programs.

2. A program-guide-display controlling apparatus comprising:
    means for displaying a plurality of program guides on a display unit in a matrix form by using one of the ordinate and the abscissa as a channel number axis and another one as a time axis, means for determining whether any of a plurality of time periods includes a purchased one of a plurality of purchasable programs; and means for distinguishing on the display unit between the time periods which include a purchased one of the plurality of purchasable programs and the time periods which do not include any purchased one of the plurality of purchasable programs wherein the means for distinguishing comprises at least one first color associated with the time periods which include a purchased one of the plurality of purchasable programs and at least one second color which is different than the at least one first color and is associated with the time periods which do not include any purchased one of the plurality of purchasable programs.

3. A program-guide-display controlling apparatus comprising:

means for displaying a plurality of items of program guide information on a display unit in a matrix form by using one of the ordinate and the abscissa as a channel number axis and another one as a time axis;

means for determining whether any of a plurality of time periods includes a purchased one of a plurality of purchasable programs, wherein a first of the plurality of time periods begins immediately after a second of the plurality of time periods ends; and means for distinguishing on the display unit between the time periods which include a purchased one of the plurality of purchasable programs and the time periods which do not include any purchased one of the plurality of purchasable programs, wherein the distinguishing means comprises a means for displaying a bar proximate to the time periods which include a purchased one of the plurality of purchasable programs.

4. A program-guide-display controlling apparatus comprising:

means for displaying a plurality of program guides on a display unit in a matrix form by using one of the ordinate and the abscissa as a channel number axis and another one as a time axis;

selecting means for allowing at least one time period to be selected by a user, wherein at least one a plurality of programs is associated with the at least one time period; and means for distinguishing on the display unit between the at least one time period selected by the user and time periods not selected by the user, wherein said means for distinguishing comprises at least one first color associated with the at least one time period selected by the user, and at least one second color which is different than the at least one first color and is associated with time periods not selected by the user.

5. The program-guide-display controlling apparatus according to claim 4, wherein said setting means allows the starting time and the ending time of the at least one time period to be set by the user.

6. The program-guide-display controlling apparatus according to claim 4, wherein the setting means allows the starting time and the ending time of the at least one time period to be set for each day of the week by the user.

7. A television receiver comprising a program-guide display controlling apparatus:

means for displaying a plurality of program guides on a display unit in a matrix form by using one of the ordinate and the abscissa as a channel number axis and another one as time axis;

means for determining whether any of a plurality of time periods includes a purchased one of a plurality of purchasable programs, wherein a first of the plurality of time periods begins immediately after a second of the plurality of time periods ends; and means for distinguishing on the display unit between the time periods which include a purchased one of the plurality of purchasable programs and the time periods which do not include any purchased one of the plurality of purchasable programs.

8. A television receiver comprising a program-guide-display controlling apparatus for displaying a plurality of program guides on a display unit in a matrix form by using one of the ordinate and the abscissa as a channel number axis and another one as a time axis, said program-guide-display controlling apparatus comprising:

selecting means for allowing at least one time period to be selected by a user, wherein at least one a plurality of programs is associated with the at least one time period; and means for distinguishing on the display unit between the at least one time period selected by the user and time periods not selected by the user, wherein said setting means allows the starting time and the ending time of the at least one time period to be set by the user, and said means for distinguishing comprises at least one first color associated with the at least one time period selected by the user, and at least one second color which is different than the at least one first color and is associated with time periods not selected by the user.

* * * * *